United States Patent
Neifer

(12) United States Patent     (10) Patent No.: US 6,520,417 B1
(45) Date of Patent: Feb. 18, 2003

(54) CARD READER FOR CHIP CARDS

(75) Inventor: Wolfgang Neifer, Freising (DE)

(73) Assignee: SCM Microsystems GmbH, Pfaffenhofen (DE)

( * ) Notice: Subject to any disclaimer, the term of this patent is extended or adjusted under 35 U.S.C. 154(b) by 0 days.

(21) Appl. No.: 09/743,696

(22) PCT Filed: Jul. 15, 1999

(86) PCT No.: PCT/EP99/05061

§ 371 (c)(1),
(2), (4) Date: Mar. 15, 2001

(87) PCT Pub. No.: WO00/04486

PCT Pub. Date: Jan. 27, 2000

(30) Foreign Application Priority Data

Jul. 15, 1998 (DE) .................................... 298 12 626 U

(51) Int. Cl.⁷ ............................................. G06K 19/06
(52) U.S. Cl. ....................................... 235/492; 235/487
(58) Field of Search ................................. 235/487, 492

(56) References Cited

U.S. PATENT DOCUMENTS 5,877,488 A * 3/1999 Klatt et al. .................. 235/492

FOREIGN PATENT DOCUMENTS

| DE | 296 07 253 U1 | 8/1996 | ............ G06K/7/06 |
| DE | 297 23 227 | 7/1998 | ............ G06K/7/01 |
| DE | 298 12 626 U1 | 12/1998 | ............ G06F/7/06 |
| FR | 2 735 251 | 12/1996 | ............ G06F/3/00 |

* cited by examiner

Primary Examiner—Harold I. Pitts
(74) Attorney, Agent, or Firm—Finnegan, Henderson, Farabow, Garrett & Dunner

(57) ABSTRACT

The invention relates to a card reader for chip cards which comprises a housing of the PCMCIA type. Said housing comprises a multi-contact strip (16) on the front end thereof, and has an insertion slot for the chip card on the rear end of the housing. Said insertion slot is formed between a base plate (14) and a cover plate (12) which is parallel thereto. The base plate (14) extends beyond the cover plate (12) at the rear end of the housing.

12 Claims, 1 Drawing Sheet

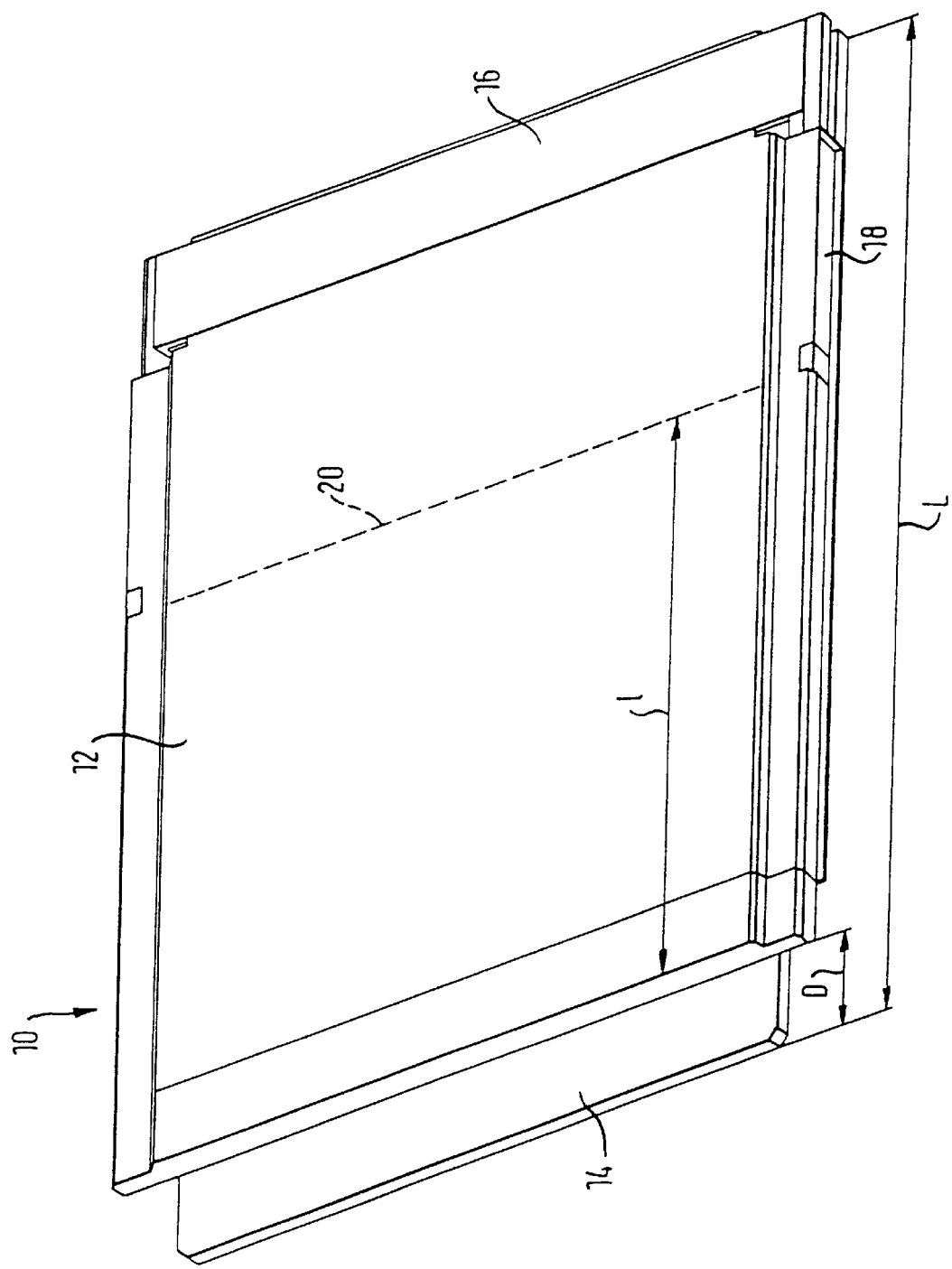

CARD READER FOR CHIP CARDS

The invention relates to a card reader for chip cards, comprising a standardized housing in the PCMCIA format.

The housing of such a card reader has a multiple contact row at the front end thereof and an insertion slot for the chip card at the rear end thereof, the insertion slot being formed between a base plate and a cover plate which is parallel thereto. The chip cards, which are likewise in a standardized format, have about the same width as the housing in the PCMCIA format. The housing is therefore open at its long narrow sides. Unless a guide sleeve is provided, as is described, for example, in DE 43 10 517 A1, which protrudes out of the device in which the card reader is inserted, the base plate and the cover plate are connected with each other only at the front end of the housing and can therefore be easily bent out of shape. While the aforementioned guide sleeve avoids this problem, it is not in conformity with the PCMCIA format because compared with this format the housing is longer. Another disturbing point is that the guide sleeve projects out of the device into which the housing of the card reader has been inserted.

Disclosed in FR-A-2 735 251 is a card reader for chip cards, comprising a housing in the PCMCIA format which has a multiple contact row at the front end thereof and an insertion slot for the chip card at the rear end thereof, the insertion slot being formed between a base plate and a cover plate which is parallel thereto, the length of the base plate corresponding to that of the PCMCIA format.

The invention provides a card reader for chip cards which does not exceed the outer dimensions of the standardized PCMCIA format (without extension) and yet still has an increased mechanical stability. According to a first aspect of the invention the base plate protrudes beyond the cover plate at the rear end of the housing. The length of the cover plate, which is reduced in comparison with that of the base plate, results in a smaller length of the effective lever in respect of the forces applied at the free end of the cover plate. According to a second aspect of the invention the insertion slot has an end which is adjacent to the multiple contact row and is spaced approximately 15 to 30 mm from the front end of the housing. Thereby, a reduction in the length of the above-mentioned effective lever is achieved. While the chip card in its inserted condition will then project farther out of the housing of the card reader, this is not disturbing; on the contrary, owing to the chip card projecting, it is even easier to handle. In addition, due to the shortened cover plate insertion of the chip card is facilitated because the latter may be placed on the protruding edge of the base plate and is given a guidance there.

Further features and advantages of the invention will be apparent from the following description and from the drawing to which reference is made. The single figure of the drawing shows a perspective view of the card reader in accordance with the invention.

In the figure only the housing of the card reader is shown, since solely the housing is relevant to the invention.

The housing of the card reader 10 is comprised of a cover plate 12, a base plate 14 arranged parallel thereto at a small distance, a multiple contact row 16 at the front end face of the housing and a pair of short side walls 18 on the narrow sides of the housing adjacent to the multiple contact row 16. The narrow side walls 18 extend only as far as a line 20 indicated by dashes, which defines the depth of the insertion slot for the chip card. This insertion slot is formed between the cover plate 12 and the base plate 14.

The length L of the base plate corresponds to the corresponding dimension of the housing in the standardized PCMCIA format. The length of the cover plate 12, in contrast, is shorter by the difference D in measurement. The length of the effective lever for forces applied at the free end of the cover plate 12 is designated by 1 in the FIGURE. Reducing this measurement 1 results in a substantial increase in the mechanical stability of the housing at the rear end thereof. The difference D in measurement amounts to about 3 to 10 mm, and the measurement L-1 amounts to about 15 to 30 mm. At the free rear edge of the cover plate 12 there is further provided an oblique surface which widens the insertion slot, thus assisting in the insertion of the chip card.

What is claimed is:
1. A chip card reader comprising:
   a housing, said housing comprising:
      a front end and a rear end, a pair of narrow side edges extending between said front and rear ends, wherein length is defined in a first direction between said front and rear ends, wherein width is defined in a second direction between said pair of narrow side edges, wherein said front end comprises a multiple contact row, and wherein said front end has substantially similar width to said rear end;
      a base plate and a cover plate, wherein said base plate and said cover plate are parallel to each other; and
      an insertion slot, wherein said insertion slot is positioned between said base plate and said cover plate, wherein said base plate has a first length corresponding to the PCMCIA standard, wherein said base plate has a second length greater than said first length, and wherein said base plate protrudes beyond said cover plate at said rear end;
   wherein said housing has a generally flat shape according to the PCMCIA standard.
2. The chip card reader according to claim 1, wherein said first length exceeds said second length by about 3 mm to about 10 mm.
3. The chip card reader according to claim 1, wherein said insertion slot extends from said rear end in said first direction towards said front end, said insertion slot extending to a distance of about 15 mm to about 30 mm from said front end.
4. The chip card reader according to claim 3, further comprising a first housing area, wherein said first housing area is defined by said base plate connecting to said cover plate at said side edges, said first housing area extending from said insertion slot to said front end.
5. The chip card reader according to claim 1, wherein said insertion slot is open at said side edges.
6. The chip card reader according to claim 1, wherein said cover plate at said rear end has an edge with an oblique surface, said oblique surface widening said insertion slot.
7. A chip card reader comprising:
   a housing, said housing comprising:
      a front end and a rear end, a pair of narrow side edges extending between said front and rear ends, wherein length is defined in a first direction between said front and rear ends, wherein width is defined in a second direction between said pair of narrow side edges, wherein said front end comprises a multiple contact row, and wherein said front end has substantially similar width to said rear end;
      a base plate and a cover plate, wherein said base plate and said cover plate are parallel to each other; and
      an insertion slot, wherein said insertion slot is positioned between said base plate and said cover plate, wherein said insertion slot extends from said rear end in the first direction towards said front end, and wherein said insertion slot extends from said rear end in said first direction towards said front end, said insertion slot extending to a distance of about 15 mm to about 30 mm from said front end, wherein said housing has a generally flat shape according to the PCMCIA standard.

8. The chip card reader according to claim 7, further comprising a first housing area, wherein said first housing area is defined by said base plate connecting to said cover plate at said side edges, said first housing area extending from said insertion slot to said front end.

9. The chip card reader according to claim 7, wherein said insertion slot is open at said side edges.

10. The chip card reader according to claim 7, wherein said base plate has a first length corresponding to the PCMCIA standard, wherein said base plate has a second length greater than said first length, and wherein said base plate protrudes beyond said cover plate at said rear end.

11. The chip card reader according to claim 10, wherein said first length exceeds said second length by about 3 mm to about 10 mm.

12. The chip card reader according to claim 7, wherein said cover plate at said rear end has an edge with an oblique surface, said oblique surface widening said insertion slot.

* * * * *